United States Patent
Jahnes et al.

[11] Patent Number: 5,729,201
[45] Date of Patent: Mar. 17, 1998

[54] IDENTIFICATION TAGS USING AMORPHOUS WIRE

[75] Inventors: Christopher Jahnes, Monsey; Richard Joseph Gambino, Stony Brook; Milan Paunovic, Port Washington; Alejandro Gabriel Schrott; Robert Jacob von Gutfeld, both of New York, all of N.Y.

[73] Assignee: International Business Machines Corporation, Armonk, N.Y.

[21] Appl. No.: 496,838

[22] Filed: Jun. 29, 1995

[51] Int. Cl.⁶ .................................................. G08B 13/14
[52] U.S. Cl. .......................................... 340/572; 235/493
[58] Field of Search ............................... 340/572, 551, 340/825.34; 235/493

[56] References Cited

U.S. PATENT DOCUMENTS

| | | | |
|---|---|---|---|
| Re. 32,427 | 5/1987 | Gregor et al. | 340/572 |
| 4,568,921 | 2/1986 | Pokalsky | 340/572 |
| 4,660,025 | 4/1987 | Humphrey | 340/572 |
| 4,686,516 | 8/1987 | Humphrey | 340/572 |
| 4,940,966 | 7/1990 | Pettigrew et al. | 340/572 X |
| 4,980,670 | 12/1990 | Humphrey et al. | 340/572 X |
| 5,003,291 | 3/1991 | Strom-Olsen et al. | 340/572 X |
| 5,130,698 | 7/1992 | Rauscher | 340/572 X |
| 5,175,419 | 12/1992 | Yamashita | 235/449 |
| 5,181,020 | 1/1993 | Furukawa et al. | 340/572 X |
| 5,191,315 | 3/1993 | Cordery et al. | 340/572 |
| 5,313,192 | 5/1994 | Ho et al. | 340/572 X |
| 5,519,379 | 5/1996 | Ho et al. | 340/572 X |
| 5,565,847 | 10/1996 | Gambino et al. | 340/572 |

*Primary Examiner*—Thomas Mullen
*Attorney, Agent, or Firm*—Stephen S. Strunck

[57] ABSTRACT

An inexpensive multibit magnetic tag is described which uses an array of amorphous wires in conjunction with a magnetic bias field. The tag is interrogated by the use of a ramped field or an ac field or a combination of the two. The magnetic bias is supplied either by coating each wire with a hard magnetic material which is magnetized or by using magnetized hard magnetic wires or foil strips in proximity to the amorphous wires. Each wire switches at a different value of the external interrogation field due to the difference in the magnetic bias field acting on each wire.

5 Claims, 6 Drawing Sheets

IDENTIFICATION TAGS USING AMORPHOUS WIRE

CROSS-REFERENCE TO RELATED APPLICATION

The invention disclosed and claimed herein is related to the invention disclosed and claimed in Application Ser. No. 08/344,196 filed Nov. 23, 1994, now U.S. Pat. No. 5,538,803.

DESCRIPTION

Background of the Invention

1. Field of the Invention

The present invention relates generally to an identification tag and more particularly to an identification tag which can be encoded with multiple bits of information and which can be remotely interrogated and read.

2. Description of the Related Art

Retail tagging, tagging used in the road/air-freight package industry, personnel identification tagging, pallet tagging in manufacturing processes, etc., requires a tag for identifying a product, article or person in detail. With a sufficient number of bits, the tag can be interrogated to yield useful information such as what the product is, its date of manufacture, its price, whether the product, article or person has been properly passed through a check-out counter or kiosk, etc. Further, identifying a large number of products via tags can lead to a new type of check-out system for the retail industry giving rise to the much hoped for "no-wait check-out".

Conventional tags and tag systems have had a number of problems including: 1) having only one bit, typical of anti-theft tags, or 2) requiring a large amount of power to read the tag, thus requiring a tag battery (or other suitable power source), or 3) being relatively easy to defeat by tampering.

Multibit, remotely-sensed tags are needed for retailing, inventory control and many other purposes. For many applications, the cost must be low and the tags must be able to be individually encoded. Further, when the tag is interrogated it must produce a distinctive signal to reliably identify the article to which the tag is attached or coupled.

Some conventional tags have employed the Barkhausen jump effect. Generally, the Barkhausen effect is characterized by a tendency for magnetization to occur in discrete steps rather than by continuous change, thereby giving rise to a large temporal flux change, $d\phi/dt$, which is key for inducing a sizable voltage in a sensing or pickup cot.

For example, U.S. Pat. No. 5,181,020 describes a thin-film magnetic tag having a magnetic thin film formed on a polymer substrate and a method for producing the same. The thin film exhibits a large Barkhausen discontinuity without intentional application of external torsional or tensile stress on use. A particular disclosed use is as a marker or tag for use in an article surveillance system wherein articles may be identified by interrogating the tagged article in a cyclic magnetic field of a predetermined frequency in a surveillance area and detecting a harmonic wave of the magnetic field generated by the tag in the surveillance area.

This conventional system is only a single bit element using a single Barkhausen layer with no ability to develop a code to distinguish items.

U.S. Pat. No. 5,313,192 describes another single bit tag which relies on the Barkhausen effect. The tag of this invention is selected to include a first component comprised of a soft magnetic material which constitutes the bulk of the tag. A second component comprised of a semi-hard or hard magnetic material is integral with the first component. The tag is conditioned such that the second component has activating and deactivating states for placing the tag in active and deactivated states, respectively. Such conditioning includes subjecting the composite tag to predetermined magnetic fields during thermal processing stages.

By switching the second component between its activating and deactivating states the tag can be switched between its active and deactived states. A reusable tag with desired step changes in flux which is capable of deactivation and reactivation is thereby realized.

U.S. Pat. No. 4,980,670 describes a one bit magnetic tag formed from a magnetic material having domains with a pinned wall configuration. The resulting hysteresis characteristic for that material is such that upon subjecting the material to an applied alternating magnetic field, the magnetic flux of the material undergoes a regenerative step change in flux (Barkhausen jump) at a threshold value when the field increases to the threshold value from substantially zero and undergoes a gradual change in flux when the field decreases from the threshold value to substantially zero. For increasing values of applied field below the threshold, there is substantially no change in the magnetic flux of the material. The tag may be deactivated by preventing the domain walls from returning to their pinned condition by, for example, application of a field of sufficiently high frequency and/or amplitude.

U.S. Pat. No. 4,940,966 describes the use of a plurality of magnetic elements in predetermined associations (e.g. with predetermined numbers of magnetic elements and with predetermined spacings between said elements), for identifying or locating preselected categories of articles. When the articles are caused to move relative to a predetermined interrogating magnetic field, each particular association of magnetic elements gives rise to a magnetic signature whereby the article or category of article carrying each of the predetermined associations can be recognized and/or located.

U.S. Pat. No. 4,660,025 describes a marker for use in an electronic surveillance system. The marker, which can be in the form of a wire or strip of magnetic amorphous metal, is characterized by having retained stress and a magnetic hysteresis loop with a large Barkhausen discontinuity. When the marker is exposed to an external magnetic field whose field strength, in the direction opposing the instantaneous magnetic polarization of the marker, exceeds a predetermined threshold value, a regenerative reversal of the magnetic polarization of the marker occurs and results in the generation of a harmonically rich pulse that is readily detected and easily distinguished.

U.S. Pat. No. 5,175,419 describes a method for interrogating an identification tag comprised of a plurality of magnetic, thin wires or thin bands which have highly rectangular hysteresis curves and different coercive forces. The wires or bands are preferably of amorphous material, but means for obtaining the highly rectangular hysteresis curves and different coercive forces are not taught; nor is the concept taught of using a time varying magnetic field superimposed on a ramp field for interrogation.

SUMMARY OF THE INVENTION

An inexpensive multibit magnetic tag is described which uses an array of amorphous wires in conjunction with a magnetic bias field. The tag is interrogated by the use of a ramped field or an ac field or a combination of the two. The magnetic bias is supplied either by coating each wire with a hard magnetic material which is magnetized or by using magnetized hard magnetic wires or foil strips in proximity to the amorphous wires. Each wire switches at a different value of the external interrogation field due to the differences in the magnetic bias field acting on each wire.

BRIEF DESCRIPTION OF THE DRAWINGS

The foregoing and other objects, aspects and advantages of the invention will be better understood from the following detailed description of the invention with reference to the drawings, in which.

DETAILED DESCRIPTION OF THE INVENTION

Figure 1:
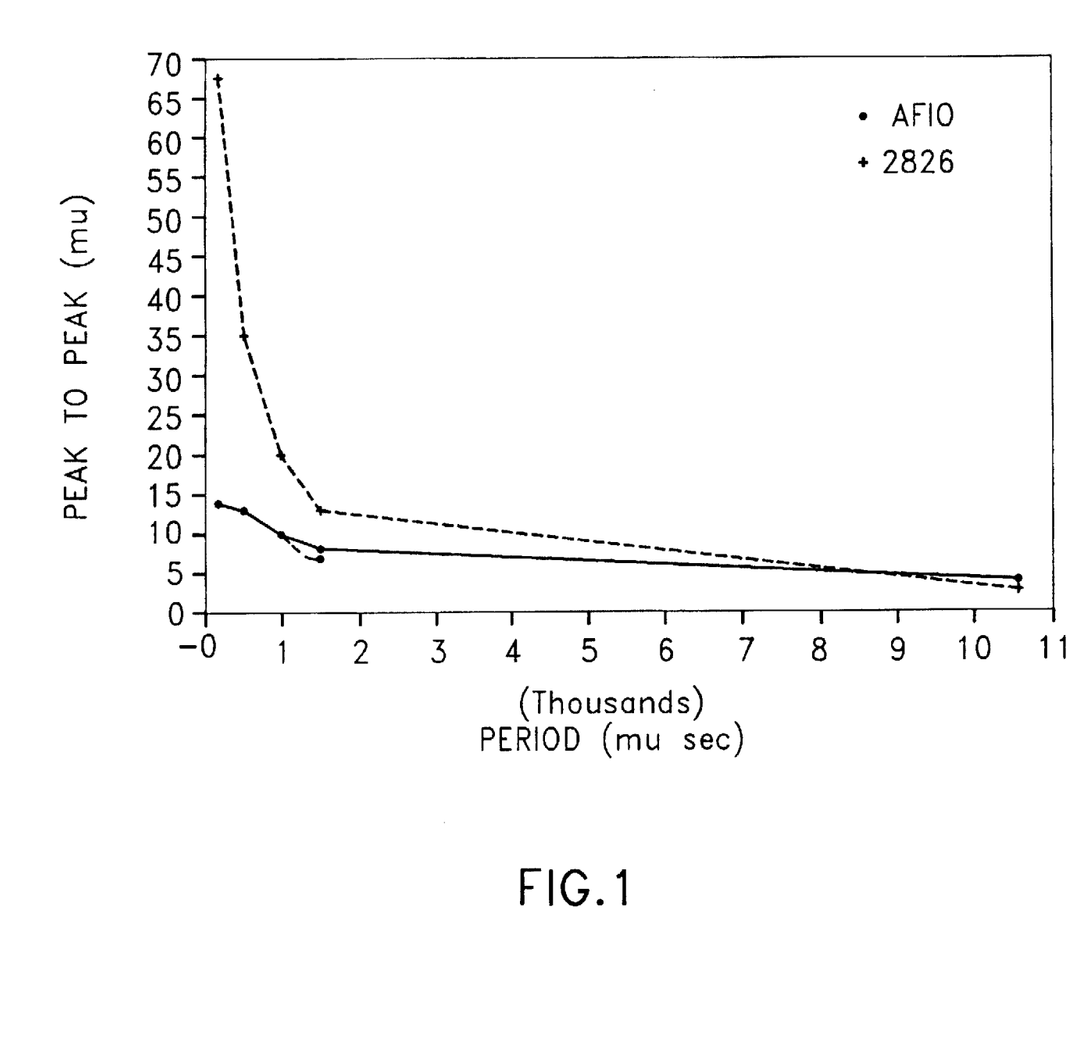
FIG. 1 is a graph comparing the peak-to-peak response of amorphous AF10 wire to amorphous 2826 magnetic strip as a function of 1/frequency.

We have discovered that amorphous magnetic wires produce a larger signal per unit volume than amorphous ribbons over a wide range of frequencies up to the kHz range. This frequency range is one order of magnitude greater than the frequency utilized in U.S. Pat. No. 4,660,025. Advantageously, this higher frequency range results in harmonics that are better separated than those produced by the lower frequencies of the '025 patent which allows them to be more readily discriminated and detected. This is shown in FIG. 1 where the peak to peak amplitude of the switching peak of 125 μm dia. AF10 amorphous wire made by Unitika Corporation and 2826 amorphous ribbon (50 μm thick×2 mm wide×75 mm long), made by Allied Signal, were compared at various frequencies. The signal from the AF10 wire (peak-to-peak amplitude) is within a factor of 2 of the ribbon even though the ribbon has 8 times the cross-sectional area. The data taken by way of these experiments is shown in Table 1 where FWHM stands for the full width of the detected waveform of the switching peak at half maximum amplitude. The frequency is that of the applied ac field and the period is the reciprocal of the frequency. P-to-P is the peak-to-peak amplitude of the detected signal using a figure-8 pickup coil.

TABLE I

| | | AF10 WIRE | | 2826 RIBBON | |
|---|---|---|---|---|---|
| Period (μ sec) | Frequency (Hz) | P-to-P (mv) | FWHM (μ sec) | P-to-P (mv) | FWHM (μ sec) |
| 10,000 | 94 | 3.5 | 150 | 2.6 | 1200 |
| 1,500 | 667 | 6.0 | 100 | 12.5 | 225 |
| 1,000 | 1,000 | 9.8 | 90 | 20.0 | 150 |
| 500 | 2,000 | 12.8 | 60 | 35.0 | 75 |
| 200 | 5,000 | 14.1 | 75 | 67.0 | 45 |

As shown in Table I, with increasing frequency the width of the peak relative to the period of the excitation field increases. However, this relative width is always smaller for the wire than the ribbon up to a certain frequency. At low frequencies, the FWHM for the wire is independent of frequency, in contrast to the behavior of the ribbon. This difference arises from a large Barkhausen discontinuity for the wire. In the ribbon, switching is due to normal domain wall motion which results in wider peaks. As the frequency increases the Barkhausen discontinuity in the wire cannot be fully developed and the resultant signal approaches that of the ribbon. Nevertheless, at higher frequencies, as shown in Table I, sufficiently sharp peaks may be obtained for the wire relative to the ribbon. A sharp peak is desirable because it produces a large number of harmonics.

This property makes possible a single element anti-theft "tag" for use in many applications such as the prevention of the theft of computers, circuit boards and other expensive electronic equipment. The small diameter (125 μm) of the wires makes them easier to conceal than the ribbons (2 mm×50 μm). The frequency used for interrogation of the tag is low enough to work through metal shielding, for example, the RF shielding around a CRT. One or more of the harmonics generated by the wire, when the wire is subjected to an a.c. magnetic field, is used for detection.

In addition to the advantages of the amorphous wires with respect to signal amplitude, they also have a very narrow switching peak width relative to the period of the driving field when driven at lower frequencies, on the order of 100 Hz, as shown in Table I. This makes possible a multibit tag wherein more bits can be interrogated in a given sweep field range than is the case for multibit tags based on flat strips of amorphous or non-amorphous material. For example, the wires have a hysteresis loop with a switching width, δH, of about 0.01 Oe. Thus, in a 1 Oe sweep field range, it should be possible to interrogate 100 bits (1 Oe/δH).

The advantageous properties of amorphous wires may also be explained in terms of demagnetizing factors as follows. A magnetic object accumulates free poles on its surface when it is magnetized. A field is generated by these free poles which is called the demagnetizing field, $H_D$. The demagnetizing field opposes the applied field, $H_A$. The magnitude of the effective field in the material, $H_E$ is given by:

$$|H_E|=|H_A|-|H_D| \qquad (1)$$

indicating absolute magnitudes. In other words, the applied field must overcome the demagnetizing field in order to saturate the material. Other factors like the magnetic anisotropy can make the saturation field higher but it can not be lower than $H_D$.

The demagnetizing field depends on the shape of the sample and on the magnetization of the sample. The magnetization of interest here is the saturation magnetization, $M_S$, because switching occurs near saturation, especially for a material having a square B-H hysteresis loop. The shape factor is called the demagnetizing factor, N and $H_D=NM_S$. The demagnetizing factors for the x, y, and z directions add up to $4\pi$ in the c.g.s system of units. For example, for a very long rod $N_x=N_y=2\pi$ and $N_z=0$, where the z axis is along the length of the rod.

The demagnetizing factors can be calculated exactly for ellipsoids of revolution and can be approximated for other shapes. For a rod, if K=L/D, where L is the length and D is the diameter, and K is very much greater than 1, a good approximation for N is given by:

$$N=(1/K^2)(ln(2K)-1)(4\pi) \qquad (2)$$

For a flat bar of thickness a and length b the demagnetizing factor when the field is applied along the b axis is approximately $$N=4\pi[a/(a+b)] \qquad (3)$$

Using these equations, the saturation field of wires and ribbons can be calculated and compared to the observed saturation fields. For a sample of AF10 amorphous wire 4 cm long by 125 µm in diameter, K=320. The calculated saturation field, assuming $M_s=800$ G, is 0.54 Oe, close to the experimentally observed value. In the case of a 2 cm long wire of the same diameter and composition, K=160 and the calculated saturation field is 1.87 Oe, again close to the experimentally observed value.

For a 4.5 cm long sample of 2826 amorphous ribbon 25 µm thick by 2 mm wide, and assuming $M_s=800$, the saturation field is calculated to be 5.6 Oe, somewhat smaller than the observed value of about 8 Oe.

Therefore, for wires or ribbons of about the same length, 4 cm, the saturation field is about ten times higher for the ribbon. In a given field interval, say 10 Oe, it is only possible to have 2 data bits using 4 cm long ribbons but 20 4 cm wires could be switched in the same field interval. Of course, with longer ribbons and wires the demagnetizing field would be lower but the comparison of calculation and experiment becomes difficult if the demagnetizing field is too low. For longer wires with very low demagnetizing factors the FWHM of the switch peak is a more useful but indirect measure of the demagnetizing field.

In the case of the ribbons of Example 2 of Pettigrew et al. (U.S. Pat. No. 4,940,966) with thickness=25 µm and b=length, N parallel to the length of the ribbon is equal to $4\pi(a/a+b)$ and the shape factor and demagnetizing fields are given in Table II.

TABLE 11

| b (cm) | N | $H_D$ (Oe) |
|---|---|---|
| 1 | $3.14 \times 10^{-2}$ | 25.1 |
| 2 | $1.57 \times 10^{-2}$ | 12.5 |
| 4 | $7.85 \times 10^{-3}$ | 6.3 |

For a 4 cm long, 125 µm diameter wire, $N=6.7\times10^{-4}$ and $H_D=0.54$ Oe. Thus, wires have small demagnetizing fields which lead to smaller required switching fields.

The low demagnetizing field intensity for wires is of considerable importance as the cognizant regulatory agencies continue to reduce the acceptable level of low frequency radiation that humans may be exposed to for long terms. Presently, that level is about 1 G (1 Oe).

Wires have another heretofore unrecognized benefit for use in multibit tags. At column 1, line 30 of U.S. Pat. No. 4,940,966, Pettigrew et al., it is stated that the shape of the material affects the response to an external field. This effect hinders the proposed scheme for a multibit tag. Assuming that a tag is made according to FIG. 3 of Pettigrew et al., the hysteresis curves such as those in FIG. 1 of Pettigrew correspond to the longitudinal magnetization. The transverse magnetization will have a different curve, probably less steeply inclined. For an arbitrary orientation of the tag, the transverse magnetization may create hysteresis curves that overlap and therefore are not clearly separated from one another. This will interfere with the detection scheme explained at column 3, lines 20–25, reference of Pettigrew and will be the source of ambiguity in assigning different bits. In contrast, in the multibit wire tag of this invention, the re-entrant field that produces the jump has only a longitudinal direction, and therefore there is no ambiguity related to the value of the field that generates the jump in the magnetization for a particular biased wire.

The multibit tags of the present invention consist of a set of low coercivity magnetic wires. The general desired characteristics of such wires are a large Barkhausen jump and low coercivity. The magnetic signal from the wire upon switching is due to a Barkhausen jump that occurs at a particular low applied magnetic field. The detected field emitted from the wire is generally believed to result from the domains within the inner core of the wire suddenly reversing their direction in a wave like motion starting at one end of the wire. These domains are oriented along a direction parallel to the wire axis. The outer core domains, while important to the switching mechanism, do not significantly contribute to the longitudinal magnetization. The switching is most complete when T/2 is much greater than L/v where T is the period of the external field, L is the length of the wire and v is the core domain wall velocity. However, even for values of T/2 approximately equal to L/v, partial switching occurs yielding a significantly narrow peak as shown in TABLE I even though the hysteresis loop does not indicate a large Barkhausen discontinuity. This type of inner core switching is presently believed to be a characteristic of amorphous wires only.

The features of amorphous wire make it well suited for a multibit magnetic tag. It has a small diameter so the tag can be very thin (20 mils). Referring to Table I, the peak-to-peak signal is 3.5 mv at a frequency of 94 Hz for a wire 60 mm long. The peak width is small with a FWHM of about 150 µs corresponding to a switching width on the order of about 0.01 Oe so that a larger number of bits can be incorporated while the total switching field is on the order of about 0.5 Oe.

The properties of the wire including the peak-to-peak signal amplitude and the peak width depend on the length of the wire. For narrow peaks the wire must be at least 50 mm long. The amplitude is a linear function of the wire length. Consider a personal identification card the size of a typical industrial photo I.D. card or badge about 0.5 mm thick, 60 mm wide and 80 mm long. The elements must be kept 2 mm apart to prevent the bias magnet of one tag element from acting on the adjacent tag elements. The tag element wires can be placed perpendicular to the long axis of the card. Within these constraints a 40 bit I.D. card with remote interrogation capability can be made the same size and shape as present day I.D. badges.

Figure 2:
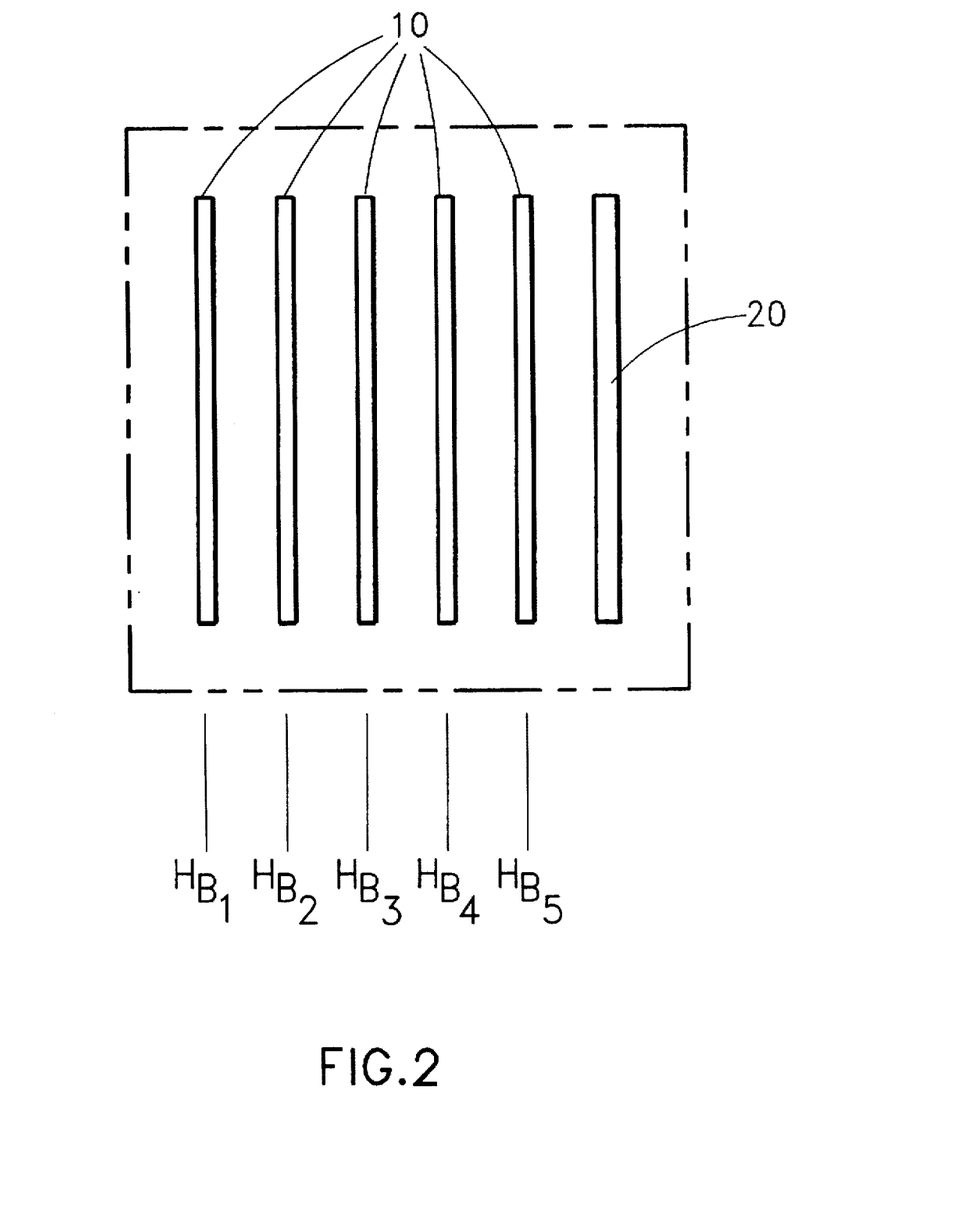
FIG. 2 is a schematic of a 5 bit amorphous wire tag biased by a single hard magnetic wire.
Figure 6:
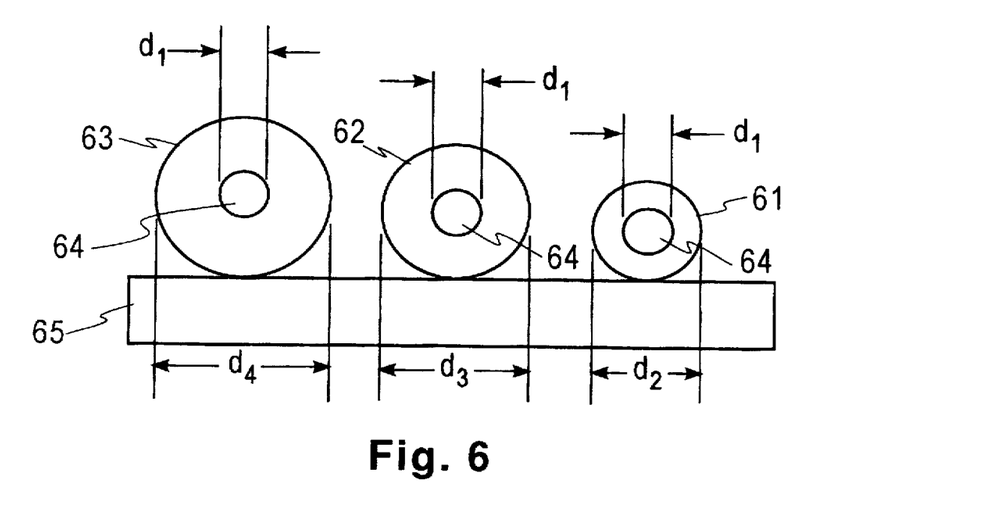
FIG. 6 is a schematic in cross-section of a 3 bit amorphous wire tag of the invention wherein each of the wires has a core wire of the same diameter but are coated with a coating of a hard magnetic material of a different thickness.

In one embodiment, as shown in FIG. 2, the wires are placed next to one another, closely spaced, in a parallel array. Typically, the wires 10 are 5 mils in diameter, 1–2 inches in length and separated from one another by a few millimeters, embedded in a substrate such as paper or thin plastic with an adhesive. In order for each wire to switch at a unique interrogation field setting, the following structures are disclosed: 1) Each wire is coated with a different thickness of a hard magnetic material, for example cobalt, nickel, or an iron alloy. This is shown in FIG. 6 for wires 61–63 wherein the diameter of the amorphous core wires 64 is constant ($d_1$), but each of the wires 61–63 resting on substrate 65 is of a different diameter ($d_2$, $d_3$, $d_4$) due to the increasing thickness of coatings of a hard magnetic material. Coating can be achieved by sputtering, plating, etc. 2) A bias magnet consisting of a hard magnetized material in the form of a wire or foil 20 is placed parallel to the aforementioned wires. For this case, the wires are not coated. Bias magnet 20 is embedded within the tag and hence an intrinsic part thereof. Thus, in FIG. 2, wires 10 experience different bias fields (e.g., $H_{B1}$, $H_{B2}$) due to their positions relative to bias magnet 20. This results in wires which have the same coercivities ($H_c$), but which switch at different values of the interrogating field. The present invention does not require wires having different coercivities as is the case in U.S. Pat. No. 5,175,419 since it is difficult to obtain such different coercivities by compositional and/or thermal treatment means.

In both cases, a preferred embodiment for switching of an individual wire utilizes a ramped field with a superimposed ac field. For case 1), the variable thickness of the coating is used to bias the wire after an initial magnetizing field is applied to the magnetic coating.

Figure 3:
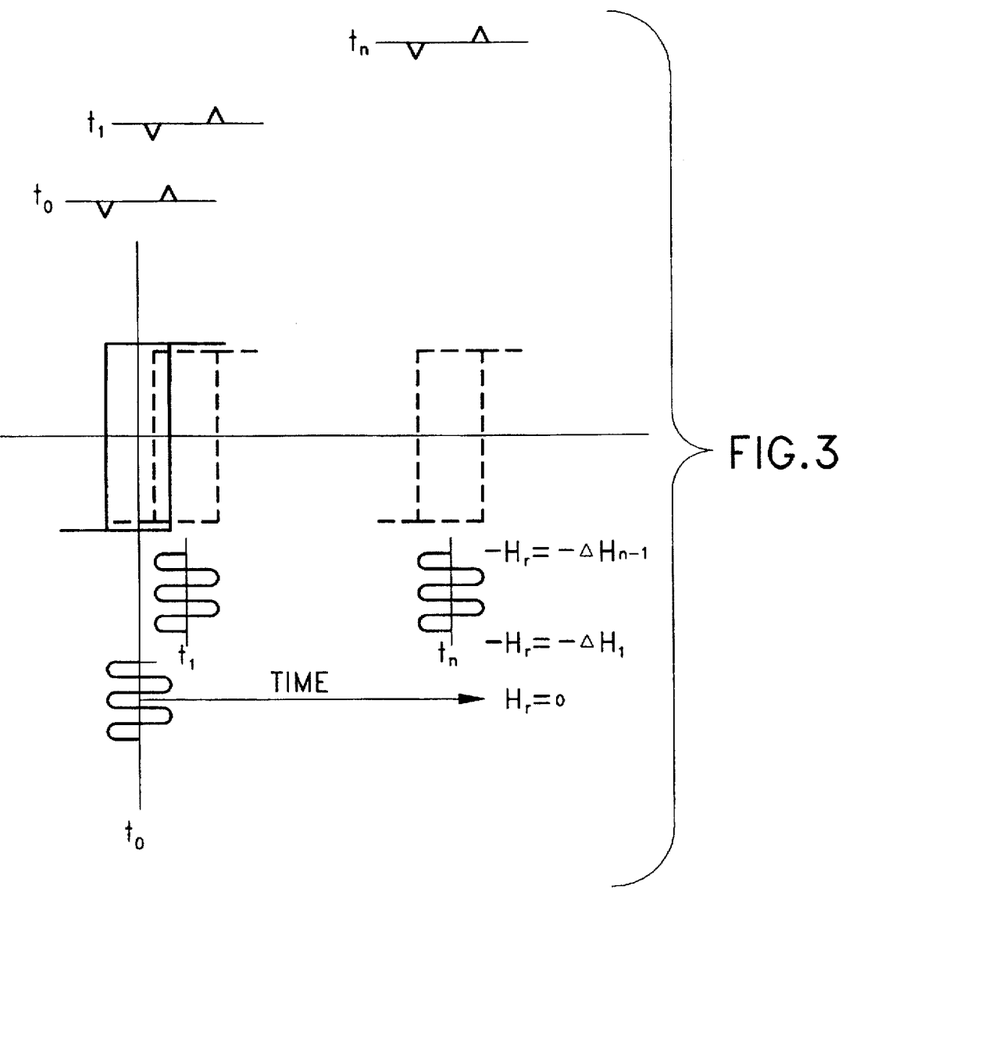
FIG. 3 is a graphical representation of the reading of a multibit amorphous wire tag interrogated by means of a ramped field with a superimposed ac field.

Thus, as the external field is ramped with time, each wire will switch at a different value of the ramp field since the variable thickness of the coating biases each wire to a different level. The change in the wire's magnetization is detected by a pickup coil. In case 2) switching will also occur as a function of the ramp since here the variable pre-bias is supplied by the magnetized wire or foil within the tag. A variation in bias for each wire occurs as a function of its distance from the bias wire. FIG. 3 shows the magnetic fields and their time relationship, $t_i$, for switching the individual wires. The internal tag bias field shifts the effective field by an amount $\Delta H_i$ which is a function of $w_i$, where w is the thickness and $\Delta s_j$ where s is the spacing between wires.

To construct a 10 bit tag, for example, using variable hard magnetic coatings requires 10 different values of the thickness and/or length of the wire coatings. An uncoated wire can be used to provide a reference switching field, $H_0$ with $\Delta H$ values measured with respect to $H_0$. To interrogate the tag, a time varying periodic field (referred to as an ac field), $H_{ac}$ is applied together with an additional ramp bias field, $H_r$. More precisely, $H_r$ should be a slowly varying periodic magnetic field with substantially equal positive and negative waveshapes and magnitudes, with equal size and shape above and below the abscissa (time axis). In order that each element switch one at a time, the conditions on the various fields are as follows with $H_c$ the coercive field of the wire, and $H_r$ the externally applied ramping field, related by $$-H_r = \Delta H_i \quad (4)$$

$$\Delta H_i - \Delta H_{i-1} > H_{ac} - H_c \quad (5)$$

The time sequence of switching with the applied field is as shown in FIG. 3. The applied dc field is varied at a rate much slower than the ac field. For example, the dc field might vary at 10 Hz, the ac field at 400 Hz. An advantage of the combination of the ac and ramp fields is that for a given value of the ramp field the ac field will cause a particular wire to switch many times which aids in the rejection of spurious signals and makes possible signal averaging to obtain larger signals. It is also possible to interrogate without the ac field using simply the ramp field to produce switching of individual bits. A sufficiently large ac field could also be used for interrogation. As the magnitude of the field increases and overcomes the bias field of each wire (bit), successive wires will switch with time within the ac cycle.

In order to establish an unambiguous code, several bits at one or both ends of the multibit array can be utilized as reference markers. It is generally important to have a reference marker since the tag position in the detecting region is arbitrary and the ramp field intensity is not completely uniform. The code is determined by the absence or presence of switching with the change in the ramp field where the marker element provides the reference signal.

Figure 5:
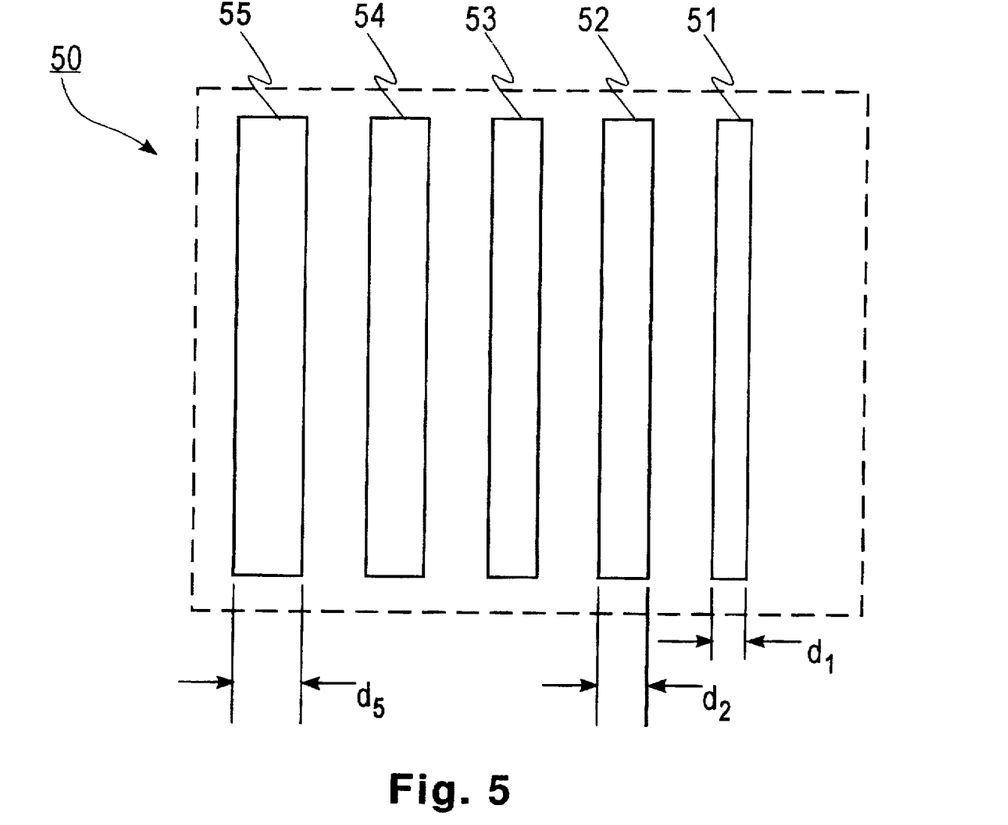
FIG. 5 is a schematic of a 5 bit amorphous wire tag of the invention wherein each of the wires is of a different diameter.
Figure 7:
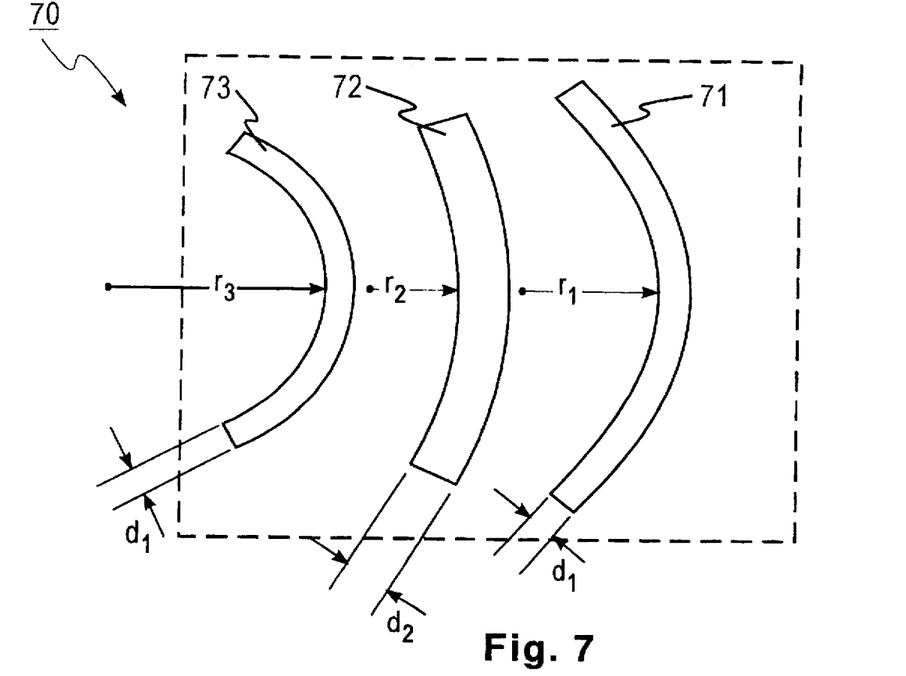
FIG. 7 is a schematic of a 3 bit amorphous wire tag of the invention wherein each of the wires has been bent to a different radius of curvature and one of the wires has a diameter greater than that of the other two.
Figure 8:
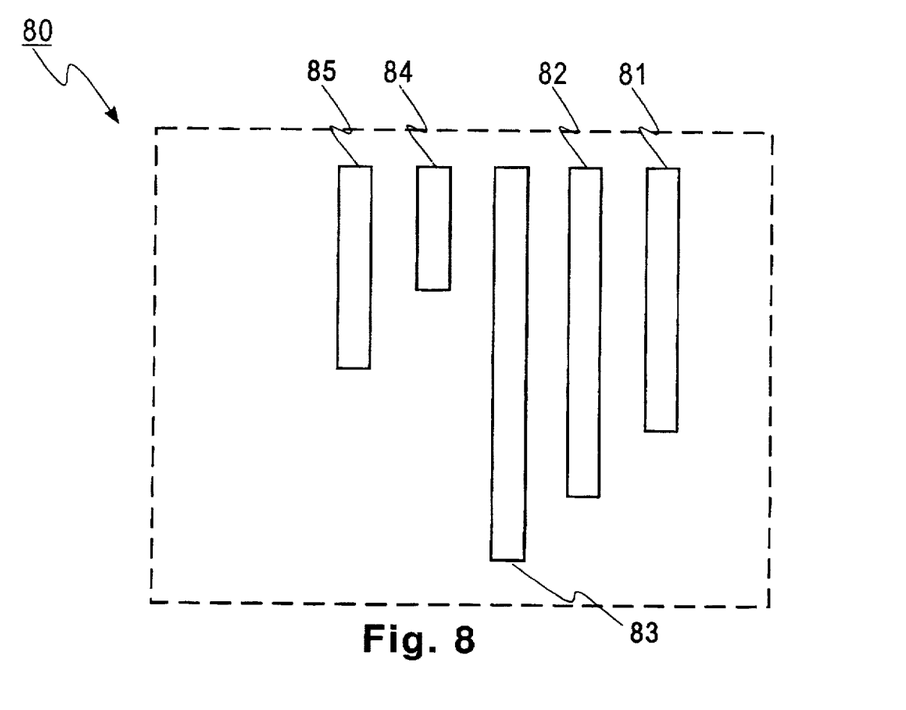
FIG. 8 is a schematic of a 5 bit amorphous wire tag of the invention wherein each of the wires is of a different length.

Other possible configurations within the scope of the invention include: 1) An array of amorphous wires, differing in thickness. Thus an array of wires of equal length but increasing diameter, e.g., wires 51–55 in FIG. 5, may switch with a ramped field, each at a different value of the applied low frequency ac field to form a code. In this embodiment, the bias magnet in the form of a high coercivity wire within the tag is optional. 2) Wires of the same or different lengths and/or thicknesses which are bent with differing radii of curvature, as shown for wires 71–73 in FIG. 7, may switch at different field strengths and thus can be used as a multibit tag, again in conjunction with an externally applied ramped field. 3) Different lengths of wire, e.g., wires 81–85 in FIG. 8 may switch at a different field due to the variation in demagnetizing field with length. This configuration can be used with or without the internal bias magnet.

Since the amorphous wires can be closely spaced in a tag and since their switching peaks can be so sharp, the tags can be "digitized" by programming (as by, for example, varying the external bias on them) such that the presence or absence of a peak at a particular frequency (or at a particular time in the time domain as a function of the level of the ramp field) corresponds to a "1" or a "0". Such a process is that of "interrogating" or "reading" the data stored on the tag while the tag is present in an externally applied field, such as that found presently in exit areas of stores. A missing wire or non-magnetic substitute can also be used to provide a "0".

To accommodate a large number of bits one makes use of the relationship between the temporal FWHM of the wire peak and the scanning rate of the ramping field. This method does not use the $H_{ac}$ field previously described, only the ramp bias field together with the hard magnet bias. Each wire is biased above the saturation point so that two adjacently present bits must be biased by a $\Delta H$ of at least the switching width (0.01 Oe), in conjunction with a scanning rate less than $$\frac{0.01 \text{ Oe}}{150 \, \mu\text{sec}} - \frac{66 \text{ Oe}}{\text{sec}} \, .$$

However, the limiting conditions for determining the number of bits is the required bias field spacing between adjacent bits to avoid multiple switching at a given setting of the ramp field. Thus, for a total excursion of 5 Oe and a $\Delta H$ of about twice the switching width (0.01 Oe) we may accommodate 250 bits, and a complete single cycle interrogation can be accomplished in ~0.1 sec.

Personalization (or individualized coding) can also be accomplished by positioning an iron wire of a different length adjacent to each amorphous wire element. All tags are identically constructed. All the iron wires are demagnetized in an a.c. field before personalization. The device for personalizing is a small electromagnet with small diameter pole tips (0.5 mm). The tag is mechanically indexed so that each tag element is positioned between the pole tips of the electromagnet. If an element is to be activated a current pulse is sent through the windings of the electromagnet to provide a field large enough to saturate the iron wire bias magnet. The iron wire is left magnetized in a remanent magnetic state (either after saturation or after application of an external field less than saturation) so that it provides a local bias field to its associated amorphous wire active element. If an iron wire is left in its demagnetized state it provides zero bias and its associated amorphous wire active element will switch at zero value of the ramp field when there is an ac field.

Through the use of sophisticated frequency analysis techniques and equipment known in the art, the presence of more than one such tag can be detected and their codes read.

Figure 4:
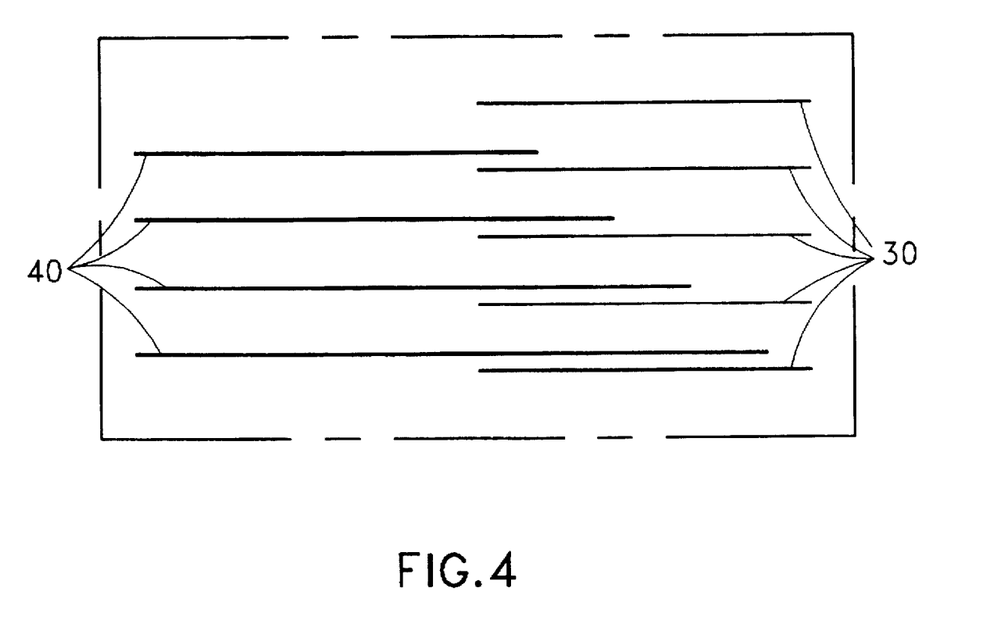
FIG. 4 is a schematic of a 5 bit amorphous wire tag of the invention.

As an example of the invention, the five bit multibit tag of FIG. 4 was assembled and tested. The tag consisted of five pieces of 75 mm long Fe-Si-B amorphous wires 30 mounted on a Gold Seal (TM) microslide, 1.2 mm thick, 50×75 mm areal dimensions. The amorphous wires were secured to the slide by strips of tape. The amorphous wires were 125 microns in diameter, having a composition of Fe77.5Si7.5B15. Bias wires 40 were iron, 420 microns in diameter placed alongside, near the ends of each amorphous wire (bit) as shown in FIG. 4. The lengths of the iron wires were 40, 60, 70 and 80 mm. The spacing between the amorphous wires was 6.3 mm. Each iron wire was first individually mounted on an index card, held by tape and then placed in position so that each wire was in contact with one of the amorphous wires. The iron wires were magnetized and left in their remanent state to serve as the magnetic bias field for each amorphous wire (bit).

The tag was placed in Helmholtz coils which were used to apply an ac field at 1.8 kHz. These coils provided a field of about 30 Oe/amp. The current used was typically 165 ma giving an ac field of about 0.5 Oe. Another set of coaxial coils was used to provide a dc bias field. These coils were of the same design as the Helmholtz pair, but had to be placed at a larger spacing as required for field uniformity. The dc field was measured with a dc Hall gaussmeter.

The positions of the Fe bias wires were set using a procedure wherein the tag was placed adjacent to a figure eight pickup coil in the Helmholtz pair. The figure eight coil was connected to an oscilloscope which was triggered on the ac current to the Helmholtz pair. The dc field was applied in opposition to the field provided by the Fe wire bias magnets. As the dc field was varied, one or more of the active elements would switch and produce a voltage peak in the oscilloscope trace. The bias magnets were adjusted so as to vary the overlap of their length with the length of the active element. This provided a means of fine tuning the bias field on the individual active elements and hence the switching point.

In this manner, it was possible to get three active elements to switch within the 0.5 Oe ac field sweep. The bias fields were also adjusted so that only one or two active elements would switch within the ac field excursion. It was also possible to decrease the amplitude of the ac field so as to switch only one active element at each level of the dc field.

While the invention has thusly been described, those skilled in the art will recognize that the invention can be practiced with modification within the spirit and scope of the appended claims.

Having thus described our invention, what we claim as new and desire to secure by Letters Patent is as follows:

1. A multibit identification tag comprising:

a plurality of magnetic structures, and one or more bias structures;

each of said magnetic structures being of amorphous metal in the shape of a wire, each of said magnetic structures having the same value of coercive force and wherein each of said plurality of magnetic structures produces a discontinuous change in magnetization at a different value of an externally applied magnetic field.

2. A tag according to claim 1, wherein said bias structures are coatings of a hard magnetic material of different thickness on one or more of said magnetic structures.

3. A tag according to claim 1 wherein said one or more bias structures is in a remanent state.

4. A tag according to claim 1 wherein said one or more bias structures are in the form of a wire.

5. A tag according to claim 1 wherein more than two bias structures are present and said bias structures are of different lengths.

* * * * *